United States Patent Office 3,271,420
Patented Sept. 6, 1966

3,271,420
STABILIZED DIKETENE AND METHOD FOR ITS PRODUCTION
Herbert Zima, Brig, Switzerland, assignor to Lonza Ltd., Gampel, Valais, Switzerland
No Drawing. Filed Nov. 27, 1964, Ser. No. 414,439
Claims priority, application Switzerland, Nov. 29, 1963, 14,627/63
6 Claims. (Cl. 260—343.9)

This invention relates to stabilized diketene and to a method for reducing the resin formation in the preparation and storage of diketene.

It is known that diketene, when stored may form various resinous polymerization products. Also in the dimerization of ketene at temperatures of, for instance, 0 to 50° C., resin formation in amounts generally in the range of about 11 to 15 percent, calculated on newly formed diketene takes place. Said resin is formed by polymerization or side-reactions of the ketene or by after-polymerization of the diketene; by further polymerization and cross-linking, it may slowly solidify and forms deposits on the walls of containers and reactors. Such deposits are observed particularly in the distillative purification of diketene.

Attempts have been made to improve the storability of diketene and to reduce its polymerization to resinous products on storing by adding to the dikete boric acid or anhydrous sulfates of weak bases, such as copper sulfate. However, such additives do not inhibit the resin formation in the dimerization of ketene. On the contrary, it was found that, in the dimerization of ketene, such additives increase the amount of the resin formed as by-product.

I have found that elemental sulfur in finely divided form, e.g. as flowers of sulfur does not only render diketene stable for storage but that it also reduces the resin formation during dimerization of the ketene without affecting the dimerization reaction proper. In addition, it eliminates deposits on the walls of the apparatus used in the manufacture and purification of diketene. Preferably, 0.1 to 2 percent by weight of sulfur calculated on the diketene produced and/or on the reaction medium used are employed.

A further embodiment of the invention consists in a process for reducing the resin formation in systems containing a member of the group consisting of keten and diketene comprising adding to the system an efficient amount of elemental sulfur. Such an efficient amount is at least 0.1% by weight with respect to the system.

When the diketene is prepared by the dimerization of ketene at temperatures of −20 to +60° C. in a liquid reaction medium which consists of a solvent for ketene, for instance, acetone, acetic anhydride, or preferably diketene, the total amount of the sulfur may be added at the beginning of the reaction. In a continuous operation I prefer to add the sulfur continuously during the reaction in the above mentioned proportions.

The inhibitory effect of elemental sulfur on the resin formation reduces, on the one hand, such resin formation due to excessive ketene polymerization in the dimerization of ketene and to subsequent polymerization of diketene; on the other hand, the dimerization reaction proper of the diketene is not affected, and this results in an increased yield, due to the smaller amount of resin formed.

The use of elemental sulfur presents a further important advantage. If the dimerization is carried out in absence of sulfur, the formed resin solidifies in the course of time and adheres as deposits or scales to the walls of the containers and apparatus. I believe that the solidification of the resin is due to subsequent polymerization or cross-linking. In the presence of sulfur the formed resin does no longer solidify and there is no longer any risk of scale or deposit formation in the apparatus.

For storing diketene, preferably 0.1 to 2 percent by weight of sulfur are used. However, any larger amount of sulfur, in the preparation of the diketene and for the storage thereof may be employed. The only disadvantage is the need to separate such large amounts of sulfur from the diketene in which it is suspended. Sometimes, it will be sufficient to remove the sulfur by filtration. If a diketene of higher purity is required, a distillative purification is preferred. If the liquid reaction medium used for the preparation of diketene is a liquid different from diketene, separation is obtained by fractionated distillation.

The following examples are given for purposes of illustration but not of limitation.

*Example 1*

A charge of 1.8 long tons of diketene was placed as reaction medium in a stainless steel vessel. For a period of several days, ketene was passed into said charge in an amount producing 1.5 long tons of diketene which were continuously withdrawn from the vessel. The reaction temperature was kept steadily at 15° C. The resin content in the reaction mixture was determined daily and amounted as average to about 11.5 percent. While maintaining throughout the same dimerization conditions (introduction of ketene and daily withdrawn of 1.5 long tons of diketene), there were added 15 kg. of elemental sulfur each only in the first, second, third, sixth, eighth and ninth day to the reaction mixture. Thereby, the resin content in the reaction mixture dropped from 11.5 percent by weight to about 8.5 percent by weight.

The following Table I shows the decrease of the resin content during dimerization. Within the first days, the resin content drops to a value of about 8.5 percent by weight and remains then substantially constant. When the addition of sulfur is stopped, the stabilizing effect of the sulfur remains for about two more days.

TABLE I

| Day | Kg. sulfur added to 1.8 long tons of diketene charge | Percent by weight of resin in diketene |
|---|---|---|
| 1 | 15 | 11.5 |
| 2 | 15 | 10.8 |
| 3 | 15 | 10.6 |
| 4 |  | 9.4 |
| 6 | 15 | 9.2 |
| 7 |  | 8.9 |
| 8 | 15 | 8.5 |
| 9 | 15 | 8.5 |
| 10 |  | 8.7 |
| 13 |  | 9.0 |
| 14 |  | 10.4 |
| 15 |  | 11.0 |

*Example 2*

This example shows the stabilizing effect of sulfur on ketene. In each case, ketene gas was introduced for 2½ hours in to a flask containing resin-free diketene and various additions of sulfur; the flask was maintained in a thermostat at a temperature of 20° C. The sulfur was added to the diketene which served as absorbent and reaction medium. The amounts of absorbed and dimerized ketene were determined by weight analysis. The amount of resin was determined by distilling off the diketene in vacuo.

The following Table II gives the amounts of resin, calculated on the amount of absorbed ketene, for various additions of sulfur to the diketene charge.

TABLE II

| Stabilizer, percent by weight of S, calculated on diketene charge | Resin by weight of the amount of absorbed ketene, in percent |
|---|---|
| ---- | 10.5 |
| 1 | 8.0 |
| 0.5 | 7.0 |
| 0.2 | 8.3 |
| 0.1 | 8.4 |

*Example 3*

The stabilizing effect of sulfur on stored diketene is illustrated by the following Table III showing the resin content of purified diketene after storage at various temperatures for various periods of time in the presence and absence of sulfur. The resin content was determined by distilling off the diketene carefully in vacuo.

TABLE III

| Temperature, °C. | Storage time | Stabilizer, percent by weight | Resin, percent by weight |
|---|---|---|---|
| 50–60 | 5 days | ---- | 2.6 |
| 50–60 | 5 days | 1 | 0.2 |
| 50–60 | 14 days | ---- | 3.7 |
| 50–60 | 14 days | 0.1 | 0.2 |
| 100 | 6 hours | ---- | 1.4 |
| 100 | 6 hours | 1 | 0.4 |

I claim:
1. A method for reducing the resin formation in systems containing a member of the group consisting of ketene and diketene comprising adding to said system an efficient amount of elemental sulfur.
2. A method for reducing the resin formation in systems containing a member of the group consisting of ketene and diketene comprising adding to said system such an amount of elemental sulfur that said system contains at least 0.1% by weight of sulfur.
3. A method for reducing the resin formation in the preparation of diketene, comprising passing ketene into a liquid reaction medium containing at least 0.1 percent by weight of sulfur.
4. The method as claimed in claim 3, wherein the temperature of said reaction medium is kept at about −20 to +60° C.
5. The method as claimed in claim 3, wherein said reaction medium is diketene.
6. Stabilized diketene containing 0.1 to 2 percent by weight of elemental sulfur.

No references cited.

WALTER A. MODANCE, *Primary Examiner.*

JAMES A. PATTEN, *Examiner.*